(12) United States Patent
Iezzi

(10) Patent No.: US 9,828,508 B2
(45) Date of Patent: Nov. 28, 2017

(54) RAPID CURE POLYSULFIDE COATINGS FOR CAVITATION RESISTANCE, EROSION RESISTANCE, AND SOUND DAMPING

(71) Applicant: Erick B. Iezzi, Alexandria, VA (US)

(72) Inventor: Erick B. Iezzi, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 105 days.

(21) Appl. No.: 14/691,716

(22) Filed: Apr. 21, 2015

(65) Prior Publication Data

US 2016/0312063 A1    Oct. 27, 2016

(51) Int. Cl.
| | | |
|---|---|---|
| *C09D 5/08* | (2006.01) | |
| *C08G 59/24* | (2006.01) | |
| *C08G 59/66* | (2006.01) | |
| *C08G 59/68* | (2006.01) | |

(52) U.S. Cl.
CPC ............... *C09D 5/08* (2013.01); *C08G 59/24* (2013.01); *C08G 59/66* (2013.01); *C08G 59/686* (2013.01)

(58) Field of Classification Search
None
See application file for complete search history.

(56) References Cited

U.S. PATENT DOCUMENTS

| | | | | |
|---|---|---|---|---|
| 3,553,283 A | | 1/1971 | Doss | |
| 3,821,166 A | * | 6/1974 | Doss | C08G 59/66 528/109 |
| 4,092,293 A | * | 5/1978 | Harris | C08G 59/66 525/523 |
| 4,177,173 A | * | 12/1979 | Carr | C08G 59/68 252/182.17 |
| 4,689,389 A | * | 8/1987 | Lee | C08G 59/02 528/109 |
| 4,847,357 A | * | 7/1989 | Shimizu | C08G 59/4085 428/419 |
| 4,950,707 A | * | 8/1990 | Shimizu | C08G 59/4085 524/609 |
| 5,128,424 A | * | 7/1992 | McGinnis | C08G 59/66 525/481 |
| 5,430,112 A | | 7/1995 | Sakata et al. | |
| 5,972,423 A | | 10/1999 | Abbey et al. | |

(Continued)

FOREIGN PATENT DOCUMENTS

| | | |
|---|---|---|
| JP | 2001-131262 A | 5/2001 |
| JP | 2013127026 | 6/2013 |

OTHER PUBLICATIONS

Pham, H. Q. et al. Epoxy Resins, 2004, Kirk-Othmer Encyclopedia of Chemical Technology, p. 347-471.*

(Continued)

*Primary Examiner* — Robert S Loewe
(74) *Attorney, Agent, or Firm* — US Naval Research Laboratory; Roy Roberts

(57) ABSTRACT

A polysulfide coating composition includes an aliphatic, aromatic or cycloaliphatic material with at least 2 thiol groups; an aliphatic, aromatic or cycloaliphatic, acryl, polyester or polysiloxane-based material with at least two epoxy groups; and a catalyst. The coating provides a durable cavitation- and erosion-resistant coating for the rudders of ships, and is also suitable for sound-damping applications.

13 Claims, 3 Drawing Sheets

(56) References Cited

U.S. PATENT DOCUMENTS

| | | | | |
|---|---|---|---|---|
| 7,847,034 B2* | 12/2010 | Burns | .................... | C08G 18/10 |
| | | | | 525/410 |
| 2005/0119449 A1 | 6/2005 | Zeitler et al. | | |
| 2012/0088862 A1* | 4/2012 | Abrami | ................ | C08G 59/182 |
| | | | | 523/435 |
| 2013/0065057 A1* | 3/2013 | Valko | ........................ | C25D 5/44 |
| | | | | 428/413 |
| 2013/0277890 A1* | 10/2013 | Bowman | ................... | C08F 2/00 |
| | | | | 264/496 |
| 2015/0011680 A1* | 1/2015 | Habas | .................. | C08G 59/027 |
| | | | | 523/400 |
| 2015/0175857 A1 | 6/2015 | Kitano | | |

OTHER PUBLICATIONS

Carioscia et al. "Evaluation and control of thiol-ene/thiol-epoxy hybrid networks" Polymer, 2007, 48, 1526-1532.*

Brandle et al. "Thiol-epoxy 'click' polymerization: efficient construction of reactive functional polymers" Polym. Chem. 2012, 3, 3224-3227.*

Written Opinion of the International Searching Authority in PCT/US2016/012403.

International Search Report in PCT/US2016/012403.

\* cited by examiner

RAPID CURE POLYSULFIDE COATINGS FOR CAVITATION RESISTANCE, EROSION RESISTANCE, AND SOUND DAMPING

BACKGROUND

Cavitation and erosion damage to the coatings on ship rudders often result in large areas of bare steel prone to corrosion in sea water. Depending on the extent of corrosion, these rudders can be damaged to the point that it affects the maneuverability of the ship. Maintaining the condition of ship rudders is a difficult task for the because the rudders are located underwater and are only accessible by divers or when the ship is in dry dock. As a result, a significant amount of time and money is spent on repairs involving divers to address structural and coatings defects underwater. The total cost of rudder repairs/repainting is a significant burden due to the lack of a rudder coating technology that can resist cavitation and erosion damage that leads to corrosion.

Commercially-available coatings that have been used on rudders fall into two categories: thick trowel-applied coatings and traditional spray-applied anti-corrosive coatings. The former are viscous two-component (2K) elastomeric epoxies and polyurethanes, which are applied via trowel or specialty brush/applicator at a thickness of about ¼ inch (6.35 mm) or greater. The latter are thin-build systems, such as the MIL-DTL-24441 two-component (2K) epoxy polyamides, which are applied in three coats for a total thickness of 15-20 mils (0.015 to 0.020 inches, or about 0.38 to about 0.5 mm). It has been observed that the thicker coatings, although marketed as being both hard and flexible, can suffer from cracking and/or cavitation damage that result in failure down to the steel substrate. The thinner coatings do not typically exhibit cracking or cavitation damage, but instead are heavily eroded within a short period of time to reveal the underlying steel substrate. As noted earlier, exposure of the steel rudder to sea water results in severe corrosion and often holes that lead to the uptake of water into the rudder.

The polyurethanes mentioned above also have the issue of containing isocyanate based materials. Isocyanates are considered toxic, and exposure can lead to adverse health effects for applicators, such as hives, fever, swelling of the arms and legs, symptoms of asthma, and sensitization.

A need exists for coatings suitable to reduce cavitation and erosion of the rudders of ships, preferably without containing isocyanates, while providing long coating life with minimal maintenance A need also exists for coatings providing sound damping ability.

BRIEF SUMMARY

A primary purpose of the invention is to provide durable cavitation- and erosion-resistant coatings for the rudders of ships. The coatings are preferably high-solids and/or solvent-free, cure (crosslink) rapidly, do not contain toxic isocyanates, and will adhere to high solids epoxy primers. Although the coatings are designed for the rudders of Navy surface ships, the coatings may have application on submarines and commercial vessels where cavitation and erosion of rudders occurs. The coatings can also be utilized to provide sound damping, such as for military platforms, within buildings and on vehicles due to its ability to absorb and rapidly dissipate energy.

A polysulfide coating can be generated upon reaction of thiol-containing materials with epoxy-containing materials to form thioether (i.e, —C—S—C—), or sulfide, linkages. A reaction scheme for bifunctional components is shown below. A composition with multiple sulfide linkages is a polysulfide.

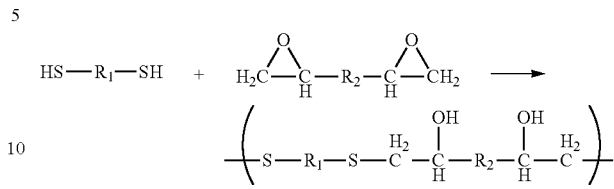

In one embodiment, the polysulfide coating includes an aliphatic, aromatic or cycloaliphatic material with at least 2 thiol groups; an aliphatic, aromatic or cycloaliphatic, acryl, polyester or polysiloxane-based material with at least two epoxy groups; and a catalyst.

In another embodiment, a method of coating includes providing polysulfide coating composition comprising: an aliphatic, aromatic or cycloaliphatic material with at least 2 thiol groups; an aliphatic, aromatic or cycloaliphatic, acryl, polyester or polysiloxane-based material with at least two epoxy groups; and a catalyst; and applying the coating composition to a surface via one or more methods selected from the group consisting of application by plural component spray equipment, brushing, rolling, or troweling.

BRIEF DESCRIPTION OF THE DRAWINGS

FIG. 1A shows an trithiol and FIG. 1B shows a tetrathiol molecule.

DETAILED DESCRIPTION

Definitions

Figure 1B:
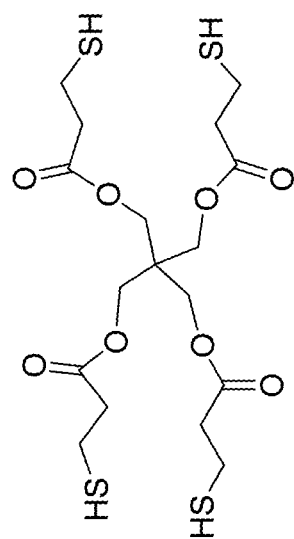
FIGS. 1A and 1B show exemplary components of the polysulfide coating.
Figure 1A:
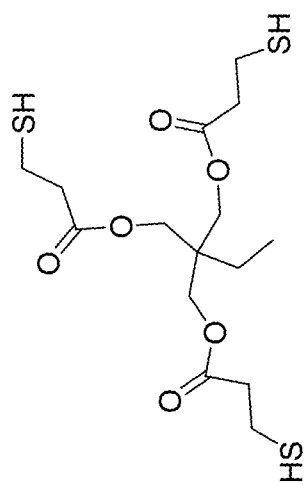

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

A primary purpose of the invention is to provide cavitation and erosion resistant coatings for the rudders, such as those of Navy surface ships. Various embodiments of the coatings are high-solids/solvent-free, cure (crosslink) rapidly, do not contain toxic isocyanates, and will adhere to high solids epoxy primers. Although the coatings are designed for the rudders of Navy ships, the coatings may have application on submarines and commercial vessels where cavitation and erosion of rudders occurs. The coatings can also be utilized to provide sound damping for military platforms, within commercial buildings and on vehicles due to its ability to absorb and rapidly dissipate energy Description The polysulfide coatings are composed of two or more components that are mixed together to generate a cured coating. A first component contains a thiol-terminated material with at least two thiol groups, while the second component contains an epoxy-based material. Preferably, the first component also contains a catalyst which can be added to accelerate the reaction between the thiol-terminated material and the epoxy-based material, however optionally a catalyst could be provided in a third component. In certain embodiments, one of the components contains a polyamide polymer, which can provide enhanced flexibility and thixotropic properties. The coating composition can include, for example, 20 wt. % to 60 wt. % thiol-terminated material, 40 wt. % to 80 wt. % epoxy-based material, and 1 wt. % to 5 wt. % catalyst. The coatings may be applied using plural-component spray equipment due to their high viscosity, although solvent can be added to reduce the viscosity for application via conventional spray methods.

The thiol-terminated material comprises at least two reactive thiol groups and an aliphatic, cycloaliphatic or aromatic backbone. The backbone may that contain ether, ester, carbonate, amide, urea and/or urethane groups. Examples include, but are not limited to, Trimethylolpropane tris(3-mercaptopropionate) (TMPMP), Pentaerythritol tetrakis(3-mercaptopropionate) (PETMP), Dipentaerythritol hexa(3-mercaptopropionate) (DiPETMP), Tris[2-(3-mercaptopropionyloxy)ethyl]isocyanurate (TEMPIC), Glykol di(3-mercaptopropionate) (GDMP), Ethoxilated-trimethylolpropan tri-3-mercaptopropionate (ETTMP), Propane-2,2-diylbis(4,1-phenylene) bis(3-mercaptopropanoate), and Soybean oil-based polythiols.

The thiol-terminated material can also contain thiourethane (thiocarbamate) linkages in the backbone with at least 2 terminal reactive thiol groups. These materials can be synthesized by reacting a thiol-terminated material with an aliphatic, cycloaliphatic or aromatic isocyanate-based material. Examples include, but are not limited to, adducts of trimethylolpropane tris(3-mercaptopropionate) with 1,6-hexamethylenediisocyanate (HDI), trimethylolpropane tris (3-mercaptopropionate) with isophorone diisocyanate (IPDI), trimethylolpropane tris(3-mercaptopropionate) with meta-tetramethylxylylene diisocyanate (TMXDI), trimethylolpropane tris(3-mercaptopropionate) with methylene diphenyl diisocyanate (MDI), and trimethylolpropane tris (3-mercaptopropionate) with polyisocyanates based on HDI and IPDI.

The epoxy resin includes at least two reactive epoxy groups are be composed of backbones that are aromatic, aliphatic, cycloaliphatic, acrylic, polyester or polysiloxane. Examples include, but are not limited to, diglycidyl ether of Bisphenol A (DGEBA), diglycidyl ether of Bisphenol F (DGEBF), ethylene glycol adducts of diglycidyl ether Bisphenol A, diglycidyl ether of hydrogenated Bisphenol A (Hydrogenated DGEBA), diglycidyl ether of cyclohexane dimethanol, diglycidyl ether of neopentyl glycol, diglycidyl ether of 1,4-butanediol, diglycidyl ether of sorbitol, trimethylol propane triglycidyl ether, polyglycidyl ether cyclosiloxane monomer, glycidyl ether silsesquioxane, and glycidyl ether methylphenyl- or diphenylphenyl polysiloxane. Optionally, the epoxy resin further includes a component having only a single reactive epoxy group.

In embodiments including a polyamide polymer, it can be aliphatic, cycloaliphatic or aromatic. Examples include, but are not limited to, fatty-acid based polyamides, dimerized fatty-acid based polyamides, nylons, para-phenylene terephthalamides, polyaspartates, and poly(hexamethylene adipamide).

The catalyst in the polysulfide coating composition is used to accelerate the curing/crosslinking of the system. The catalyst can be an aliphatic amine, cycloaliphatic amine, aromatic amine or Lewis Acid. In particular, the catalyst can be a tertiary amine. Examples include, but are not limited to, tributylamine, triethylamine, triethanolamine, 2,4,6-tris-(dimethylaminomethyl)-phenol, 1,3-bis[(3-dimethylamino)poly]urea, and dibutyltin dilaurate.

The polysulfide coating optionally includes a filler. The filler can be an amorphous, plate-like, rod-like, fiber-like or spherical particle. Examples include, but are not limited to, amorphous silica, alkali alumino silicate ceramic, glass beads, talc, mica, wollastonite, calcium carbonate, polypropylene powder, acrylic beads, polyurethane beads, polyethylene fibers, and graphite.

The polysulfide coating optionally includes one or more pigments. The pigments in the polysulfide coating composition are used to provide color and hiding of a substrate. Examples include, but are not limited to, carbon black, titanium dioxide, cobalt blue, copper phthalocyanine blue, sodium aluminum sulphosilicate, chromium green black hematite, yellow iron oxide, carbazole violet, and azo methane black.

The polysulfide coating is preferably a high-solids/solvent-free coating, although solvent could be added to the coating to reduce the viscosity for ease of formulating. Suitable solvents include, but are not limited to, Oxsol 100, pentyl propionate, butyl propionate, aromatic 100, xylene, toluene, tert-butyl acetate, and dimethyl carbonate.

The polysulfide coating can be sprayed, brushed, rolled or troweled onto a substrate, such as metal or an anti-corrosive epoxy primer. Suitable spray equipment includes plural component pumps, such as the Graco XP70 sprayer.

EXAMPLES

The example in Table 1 describes an isocyanate-free, solvent-free, rapid-cure polysulfide composition for use as a cavitation- and erosion-resistant rudder coating. The first component contains an aliphatic tri-thiol and aliphatic tertiary amine, whereas the second component contains an aromatic epoxy, a pigment and an aliphatic polyamide. The components were mixed together in a 3:2 ratio (base to hardener) and spray-applied using plural component equipment.

TABLE 1

|  | Wt. % of Formula |
| --- | --- |
| First Component (hardener) | |
| TMPMP | 37.42% |
| 1,3-bis[(3-dimethylamino)poly]urea | 3.22% |
| Second Component (base) | |
| DGEBA | 52.96% |
| Titanium dioxide | 0.45% |
| Fatty acid based polyamide | 5.95% |

Figure 2:
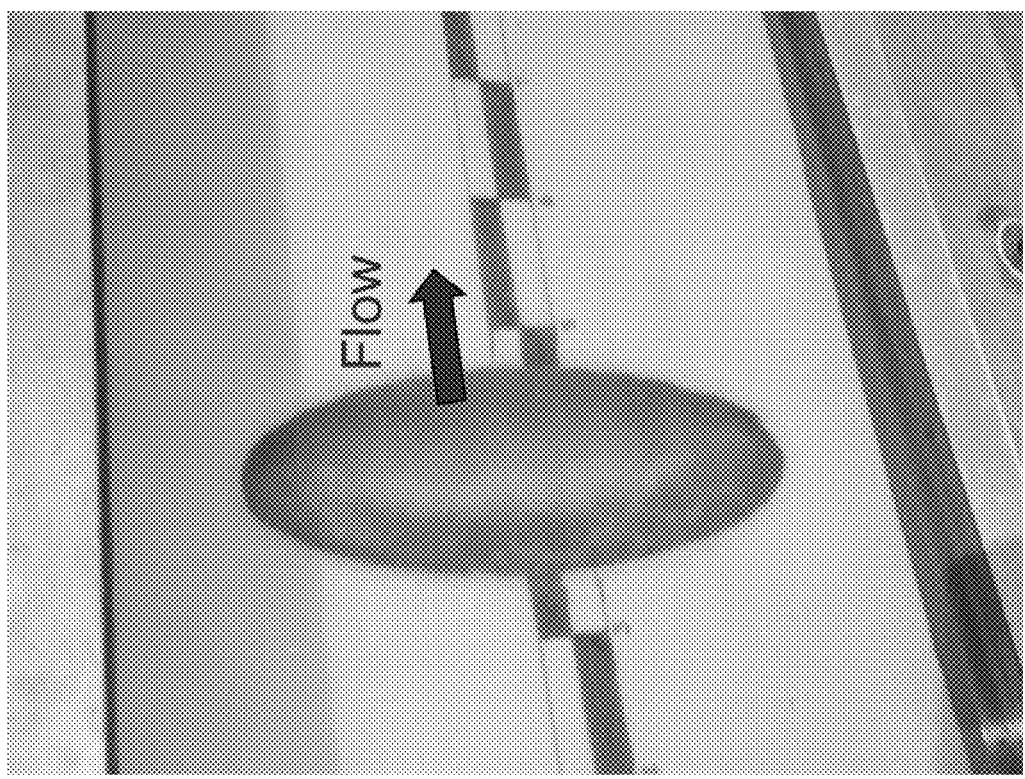
FIG. 2 shows an example of the composition after undergoing testing.

The formula above was applied at 125-150 mils thickness (about 3 to 4 mm) over an anti-corrosive epoxy primer, and the coating cured in 15-25 minutes at ambient conditions. The polysulfide coating composition demonstrated resistance to direct cavitation damage when tested with a vibratory apparatus (ASTM G32-10, but using seawater instead of fresh water) for 4 hours, unlike commercial epoxies, polyurethanes, polyureas, glass flake vinyl esters and others that resulted in pits or holes due to their poor resistance to cavitation. The polysulfide composition also showed zero signs of erosion (i.e., wear) or delamination from the primer when tested continuously in a high speed flow channel at 35 knots for 14 days, as shown in FIG. 2.

The example in Table 2 describes an isocyanate-free, solvent-free, rapid-cure polysulfide composition for use as a cavitation and erosion-resistant coating and for use in sound damping applications. The first component contains an aliphatic tri-thiol and aliphatic tertiary amine, whereas the second component contains a cycloaliphatic epoxy and a pigment. The components were mixed together in a 3:2 ratio (base to hardener) and spray-applied using plural component equipment.

TABLE 2

| | Wt. % of Formula |
|---|---|
| First Component (hardener) | |
| TMPMP | 36.9% |
| 1,3-bis[(3-dimethylamino)poly]urea | 3.73% |
| Second Component (base) | |
| Hydrogenated DGEBA | 58.89% |
| Titanium dioxide | 0.48% |

Figure 3:
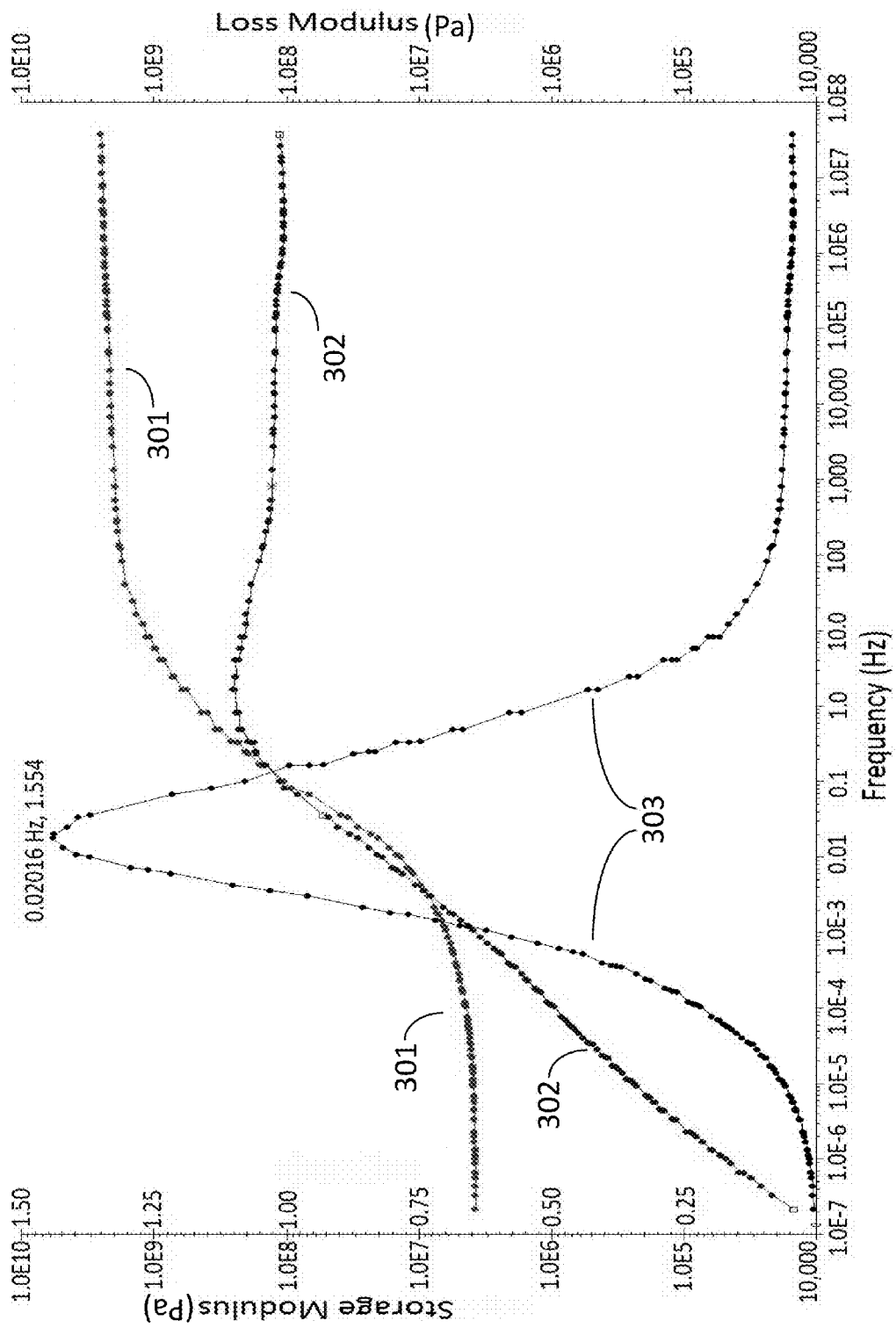
FIG. 3 presents data on the damping ability of the polysulfide coating.

The formula above was applied at 125+ mils thickness (equal to or greater than about 3 mm) over an anti-corrosive epoxy primer, and the coating cured in 30-40 minutes at ambient conditions. The polysulfide coating composition demonstrated resistance to direct cavitation damage when tested with a vibratory apparatus (ASTM G32-10, but using seawater instead of fresh water) for 4 hours, unlike commercial epoxies, polyurethanes, polyureas, glass flake vinyl esters and others that resulted in pits or holes due to their poor resistance to cavitation. The coating had a glass transition temperature (Tg) at ~20° Celsius when tested by differential scanning calorimetry (DSC). FIG. 3 is the dynamic mechanical analysis (DMA) spectra of the coating at 20° Celsius (i.e., where the coating is viscoelastic), with line 301 showing the storage modulus G' in Pascal (Pa), line 302 showing the loss modulus G" in Pa, and line 303 the Tan Delta. The spectra shows that the loss modulus of the coating is greater than the storage modulus, thus proving the coating can damp (absorb energy and convert to heat) sound between the frequency range of ~0.0005 to ~1 Hertz (Hz).

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. A polysulfide coating composition comprising:
    an aliphatic or cycloaliphatic material comprising a thiocarbamate linkage and at least 2 thiol groups;
    an aliphatic, aromatic or cycloaliphatic, acryl, polyester or polysiloxane-based material with at least two epoxy groups;
    a polyamide polymer; and
    a catalyst.

2. The coating composition of claim 1, wherein said aliphatic, aromatic or cycloaliphatic, acryl, polyester or polysiloxane-based material has at least one epoxy group.

3. The coating composition of claim 1, wherein said catalyst is an aliphatic amine, cycloaliphatic amine, aromatic amine, or a Lewis Acid.

4. The coating composition of claim 1, further comprising a pigment and/or a filler.

5. The coating composition of claim 1, wherein the composition contains no solvent.

6. The composition of claim 1, wherein the composition provides cavitation and erosion resistance for rudders.

7. The coating composition of claim 1, wherein the composition provides sound damping.

8. A polysulfide coating composition comprising:
    an aliphatic or cycloaliphatic material comprising a thiocarbamate linkage and at least 2 thiol groups;
    an aliphatic, aromatic or cycloaliphatic, acryl, polyester or polysiloxane-based material with at least two epoxy groups;
    a polyamide polymer; and
    a tertiary amine catalyst.

9. The coating composition of claim 8, further comprising a pigment and/or a filler.

10. The coating composition of claim 8, wherein the composition contains no solvent.

11. The coating composition of claim 8, wherein the composition provides sound damping.

12. The composition of claim 8, wherein the composition provides cavitation and erosion resistance for rudders.

13. A polysulfide coating composition comprising:
    a thiol-terminated material comprising a thiocarbamate linkage and at least two reactive thiol groups and an aliphatic, cycloaliphatic or aromatic backbone, selected from the group consisting of adducts of trimethylolpropane tris(3-mercaptopropionate) with 1,6-hexamethylenediisocyanate (HDI), trimethylolpropane tris(3-mercaptopropionate) with isophorone diisocyanate (IPDI), trimethylolpropane tris(3-mercaptopropionate) with meta-tetramethylxylylene diisocyanate (TMXDI), trimethylolpropane tris(3-mercaptopropionate) with methylene diphenyl diisocyanate (MDI), and trimethylolpropane tris(3-mercaptopropionate) with polyisocyanates based on HDI and IPDI;
    diglycidyl ether of hydrogenated Bisphenol A (Hydrogenated DGEBA); and
    a catalyst.

* * * * *